FM MULTIPLEX STEREO SIGNAL RECEIVER HAVING BISTABLE BLOCKING MEANS IN THE PILOT CHANNEL

Filed Oct. 5, 1964

INVENTORS
WILLEM PIETER NEIDIG
PETRUS WILLEM ZWOLLO
BY
Frank R. Trifari
AGENT

United States Patent Office 3,319,006

Patented May 9, 1967

3,319,006

FM MULTIPLEX STEREO SIGNAL RECEIVER HAVING BISTABLE BLOCKING MEANS IN THE PILOT CHANNEL

Willem Pieter Neidig and Petrus Willem Zwollo, Emmasingel, Eindhoven, Netherlands, assignors to North American Philips Company, Inc., New York, N.Y., a corporation of Delaware Filed Oct. 5, 1964, Ser. No. 401,377
Claims priority, application Netherlands, Oct. 29, 1963, 299,893
7 Claims. (Cl. 179—15)

ABSTRACT OF THE DISCLOSURE

An apparatus for improving the audio quality of a stereophonic reproduction circuit having automatic switching to monaural reproduction upon receipt of a monaural signal. A bistable trigger, having two amplifying elements blocking each other by mutual feedback, is connected to the output of a frequency doubler which in turn produces local sub-carrier oscillations in order to recover stereophonic signals. The level of the carrier signal as coupled to the trigger determines the state of the latter, and therefore the mode of reproduction.

Figure 1:
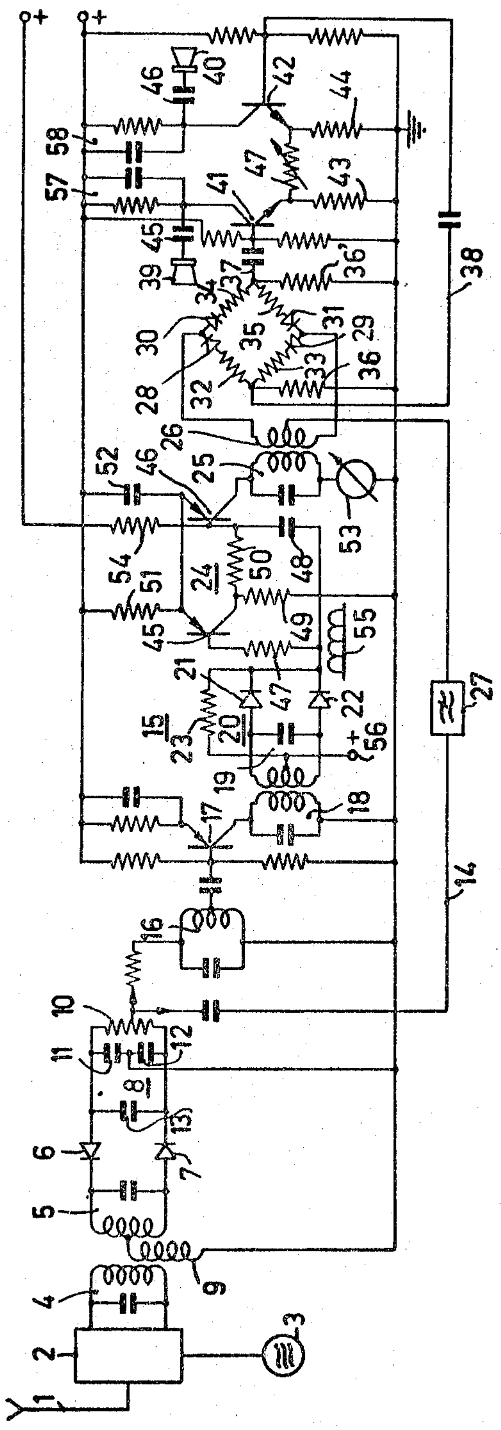

The invention relates to a device for stereophonic reproduction of signals, which are received by the device in the form of the sum signal $A+B$ of the coherent stereophonic signals A and B and of the difference signal $A-B$ of said stereophonic signals amplitude-modulated on a sub-carrier frequency with carrier-suppression together with a pilot signal of half the subcarrier frequency, said device comprising on the input side the parallel combination of an information channel passing the incoming signals and of a pilot signal channel passing exclusively the pilot signal and including a frequency doubler for the local production of the subcarrier oscillations in order to recover the stereophonic signals, the pilot channel including furthermore a blocking device, which becomes conducting only when the pilot signal exceeds a given threshold value.

In a prior patent application No. 271,292 there is described such a stereophonic reproduction device, in which stereophonic reception automatically changes over to monaural reproduction according as a stereophonic signal or a monaural signal is received. Elaborate tests of this device have shown that under special conditions, particularly in the event of interferences having a frequency in the proximity of the pilot signal frequency, the reproduction quality did not entirely come up to expectations.

The invention has for its object to provide a device of the kind set forth in which the freedom of interferences and the reproduction quality are improved in a particularly simple manner.

The device according to the invention is characterized in that the blocking device connected to the output circuit of the frequency-doubler is formed by a bistable trigger having two amplifying elements blocking each other by mutual feedback. The output voltage of the frequency doubler *a* applied to the input of the first amplifying element through a direct current connection and to the input of the second amplifying element of the bistable trigger through a separation capacitor suppressing the direct current. The bistable trigger changes over from the first stable state to the second stable state when the pilot signal exceeds the said threshold value, the locally produced subcarrier oscillation being obtained from the output circuit of the second amplifying element which is conducting in the second stable state.

The invention and its advantages will now be described more fully with reference to the drawing.

Figure 2:
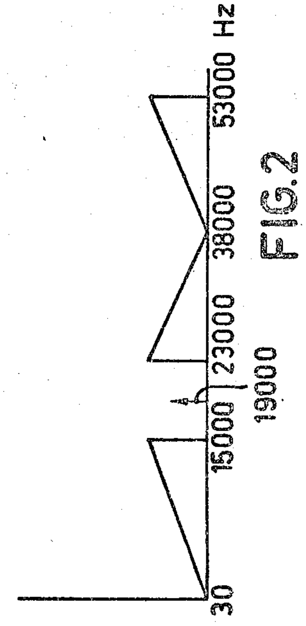

FIG. 1 shows a stereophonic broadcast receiver comprising a device according to the invention and FIG. 2 shows a frequency diagram for explaining the operation of the receiver shown in FIG. 1.

The stereophonic receiver shown in FIG. 1 is suitable for receiving signals transmitted by frequency-modulation on the same carrier frequency, which signals are formed by the sum signal $A+B$ of the coherent stereophonic signals A and B for example in the range from 30 to 15,000 c./s. and by the difference signal $A-B$ amplitude-modulated on a subcarrier frequency of 38 kc./s. with carrier suppression and by a pilot signal of 19 kc./s., the resultant modulation signal in the range from 30 to 53,000 c./s. frequency-modulating the carrier frequency with a maximum sweep of 75 kc./s.

The stereophonic receiver comprises an aerial 1 and an intermediate-frequency stage 2 having a mixing stage and an oscillator 3 connected thereto, the intermediate-frequency oscillations obtained therefrom by mixing in the range of 10,700 kc./s. being applied, subsequent to amplification and limitation, if desired, in the intermediate-frequency stage 2, to an output filter which is formed by two coupled circuits 4 and 5.

The bandpass filter 4, 5 forms part of a known type of frequency detector suitable for the detection of conventional frequency-modulation broadcast programs and comprises two rectifying cells 6 and 7 connected to the ends of the circuit 5 and passing current in opposite directions and connected to an output impedance 8, whilst a central tapping of the circuit 5 is connected to the end of a coupling coil 9, linked to the circuit 4. The output impedance 8 of the frequency detector is formed by a resistor 10, which is shunted by the series combination of two capacitors 11, 12 having an earth-connected junction and of a smoothing capacitor 13, whilst the output voltage of the frequency detector is derived from the central tapping of the output resistor 10.

Then an output voltage appears at the output impedance of the frequency detector 6, 7; the waveform of said voltage is illustrated in the frequency diagram of FIG. 2; it will be seen from this figure that it is composed of the sum signal $A+B$ in the range from 30 to 15,000 c./s. of the difference signal $A-B$ modulated, with carrier suppression, on the subcarrier frequency of 38 kc./s. and lying in the frequency range from 23,000 to 53,000 c./s. and of the pilot signal of 19,000 c./s.

In order to recover the coherent stereophonic signals A and B from the output voltage of the frequency detector 6, 7 shown in FIG. 2, said signals are applied to a device comprising, at the input end, the parallel combination of an information channel 14 passing the output voltage of the frequency detector and of a pilot channel 15 exclusively passing the pilot signal and having a frequency-doubler 20 for producing the subcarrier frequency of 38 kc./s. In the embodiment shown the pilot channel includes a pilot input filter 16 and a transistor 17, connected as a pilot amplifier, the output circuit including a pilot filter formed by two coupled circuits 18, 19, the output voltage of which is applied to the frequency doubler 20 formed by a push-pull rectifier having rectifying cells 21, 22 and an output resistor 23.

To the output circuit of the frequency doubler 20 is connected a blocking device 24, to be described hereinafter; this device is released only when the pilot signal exceeds a given threshold value. In this case the local carrier frequency of 38 kc./s. obtained by the frequency doubler 20 is derived from a circuit 25, tuned to the subcarrier oscillation of 38 kc./s. and connected with a coupling coil 26 for further processing of the sub-carrier oscillation.

The information channel 14 is connected to the central tapping of the coupling coil 26 through a low bandpass filter 27 passing only the information signals and in order to recover the stereophonic signals A and B the ends of the coupling coil 26 are connected to two electronic switches formed by rectifying cells 28, 29 and 30, 31 respectively, which switches are interconnected and are forming a closed ring, in the circumferential direction of which the pass directions of the rectifying cells 28, 29 30 and 31 are the same. Each of the rectifying cells 28, 29, 30 and 31 has connected with it in series a series resistor 32, 33, 34 and 35 respectively and the output voltage of the two electronic switches 28, 29, 30, 31 is derived from the output resistors 36, 36', which have a high value for example 1M ohm.

The coherent stereophonic signals A and B are derived from the output resistors 36 and 36' of the two electronic switches 28, 29, 30, 31; said signals are applied through low-frequency amplifiers included in separating reproducing channels 37, 38 to reproducing devices 39 and 40. The low-frequency amplifiers are identical in structure and comprise transistors 41, 42, the emitter circuits of which include non-shunted resistors 43, 44. The amplified coherent signals A and B are derived from output impedances 57 and 58 included in the collector circuits of the transistors 41 and 42. As will be apparent from the diagrammatic figure said impedances are connected through separation capacitors 45 and 46 to the reproducing devices 39 and 40. In the device shown cross-talk between the reproducing channels 37 and 38 is compensated for in a simple manner by means of a transverse resistor 47 connected between the emitter circuits 43, 44 of the transistors 41 and 42. For the compensation of the cross-talk said resistor is adjustable. A cross-talk level better than —40 db was attained in this case, which may be considered to be excellent for stereophonic reproduction.

The operation of the device described will now be explained more fully.

If the output circuit of the frequency detector 6, 7 supplies the stereophonic signal shown in FIG. 2, this is applied through the information channel 14 to the central tapping of the coupling winding 26; in the pilot channel 115 the pilot signal selected in the circuit 16 and amplified in the pilot amplifier 17 is applied, subsequent to frequency doubling in the frequency doubler 20, in the form of the local subcarrier frequency, to the electronic switches 28, 29, 30, 31, said signal serving as a switching signal for said electronic switches.

When the phase of the local subcarrier frequency at the coupling coil 26 has been caused to correspond accurately with the phase of the carrier frequency associated with the incoming signal—said phase adjustment may be carried out in a simple manner by detuning one of the circuits 18 or 19 of the pilot filter in the output circuit of the pilot amplifier 17—the coherent stereophonic signals A and B appear at the output resistors of the electronic switches 28, 29, 30, 31, since the latter are alternately released in successive half periods by the local subcarrier frequency operating as a switching signal, so that during the successive half periods the output resistors 36, 36' of the electronic switches 28, 29, 30 31 have produced across them a sampling value of the incoming information signal, which value is formed at one output resistor by the sum of the sampling value of the $A+B$ signal and the value of the $A-B$ signal during the positive half period of the subcarrier frequency and at the other output resistor by the sum of the sampling value of the $A+B$ signal and the value of the $A-B$ signal during the negative half period of the subcarrier frequency. The smoothing of said sampling values by means of the output impedances 57, 58 forming smoothing filters in the output circuits of the low-frequency amplifiers 41, 42 supplies the coherent stereophonic signals A and B and said smoothing filters 57, 58, which may at the same time operate as de-emphasis networks, suppress the pilot signal of 19 kc./s. received through the information channel 14 and the further residual detection voltages.

At the appearance of the stereophonic input signal of the kind illustrated in FIG. 2 the device described above provides a stereophonic reproduction of excellent quality, while at the appearance of a monaural input signal for example in the frequency band from 30 to 15,000 c./s. this device provides also a monaural reproduction of excellent quality. In the latter case the pilot channel 15 is blocked, so that the monaural input signal is directly transmitted through the electronic switches 28, 29 30, 31 to the separate reproducing channels 37, 38. In accordance with the polarity of the input signal of each of the two electronic switches 28, 29, 30, 31 one of the rectifying cells is conducting. With an input signal of positive polarity for example the rectifying cells 29, 30 of the electronic switches are conducing, whereas the rectifying cells 28, 31 are cut off and conversely with an input signal of negative polarity the rectifying cells 29, 30 are non-conducting and the rectifying cells 28, 31 are conducting. Through the alternately conducting rectifying cells 28, 29, 30 and 31 the monaural input signal is transmitted substantially without distortion to the output impedances of the electronic switches 28, 29, 30, 31, which impedances are formed by the resistors 36 and 36'.

Apart from the simplicity of the construction the device so far described is characterized in that when a monaural signal or a stereophonic signal is received, the reproduction switches over automatically, without mechanical agency, from stereophonic sound to monaural sound. From elaborate experiments it has been found, however, that under particular conditions the quality of the reproduced signals did not come up to expectations, the cause of which was found to be disturbances lying in the pass band of the pilot channel 15, the amplitude of which disturbances may exceed the threshold value of the pilot channel 15. If, for example such an interference signal occurs in the pilot channel 15, it produces, in the case of monaural input signal, a change-over to stereophonic reproduction, as a result of which the noise level is materially raised, since the noise in the frequency range from 23,000 to 53,000 c./s. (see FIG. 2) is transposed towards the audio-frequency band from 30 to 15,000 c./s., whereas conversely in the case of a stereophonic input signal, such an interference signal may cause, under certain conditions, a change-over to the monaural reproduction, which seriously affects the stereophonic reproduction.

In accordance with the invention a material improvement of freedom of interference is obtained in a surprisingly simple manner by the blocking device 24, connected to the output circuit of the frequency doubler 20, being formed by a bistable trigger having two transformers 45, 46, which block each other by relatively feedback, while the output voltage of the frequency doubler 20 is applied to the input of the transistor 45 through a connection allowing the direct-current component to pass, particularly a resistor 47 and, moreover, to the input of the second transistor 46 of the bistable trigger through a direct-current-suppressing separation capacitor 48, said bistable trigger changing over, when the pilot signal exceeds the said threshold value, from its first stable state to its second stable state, while the output circuit of the blocking device 24, formed by the circuit 25 tuned to the local subcarrier frequency, is included in the output circuit of the then conducting transistor 46. In the embodiment shown the collector circuit of the transistor 45 is provided with a collector resistor 49 and connected through a resistor 50 to the base electrode of the transistor 46, while the two transistors 45 and 46 have a common emitter impedance which is formed by the parallel combination of a resistor 51 and a capacitor 52. The collector circuit of the transistor 46 includes, by way of example, an indicator which indicates whether a stereophonic or a monaural reproduction is concerned and which is formed by a direct-current meter 53.

The operation of the device described above will now be explained more fully.

At the appearance of a monaural input signal, in which case there prevails no pilot signal, the bistable trigger is in the first stable state, so that the transistor 45 is conducting and the transistor 46 is cut off, which is achieved by applying a positive cut-off voltage to the base electrode of the transistor 46 through a resistor 54. The pilot channel 15 is cut off by the cut-off of the transistor 46 and the monaural input signal is applied through the information channel 14 to the electronic switches 28, 29, 30, 31, so that in the manner described above, a monaural reproduction of excellent quality is obtained. The current meter 53 in the collector circuit of the transistor 46 is not actuated, since the transistor 46 is cut off.

If at the instant $T_1$ a stereophonic input signal of the type shown in FIG. 2 appears, the pilot signal of 19 kc./s. amplified in the pilot amplifier 17 is rectified in full wave in the frequency-doubler 20, formed by a push-pull rectifier and applied, as a control-voltage, to the base electrodes of the two transistors 45 and 46. By way of example FIG. 1 shows a curve 55 indicating the output voltage of the push-pull rectifier 20 which comprises not only a strong component of the local subcarrier frequency of 38 kc./s. but also a direct-voltage component of positive polarity.

In this device the change-over of the bistable trigger 24 from the first stable state to the second stable state is produced by the positive direct-voltage component of the output voltage of the push-pull rectifier 20, which voltage can reach through the resistor 47 only the base electrode of the transistor 45, in contrast to the frequency components of the output voltage of the push-pull rectifier 20, which do not affect the change-over of the bistable trigger 45, 46 since through the resistor 47 and the capacitor 48 they reach in an identical manner the base electrode of the transistors 45 and 46. The change-over of the bistable trigger 45, 46 would not occur directly at the appearance of the stereophonic input signal at the instant $T_1$, but after a certain time delay $\Delta T$, i.e., after a period of time determined by the time of formation of the direct-voltage component of the output voltage of the push-pull rectifier 20 required for reaching the threshold voltage at which the bistable trigger 45, 46 changes over; this time of formation is mainly determined by the charging time of the capacitor 48; it may amount to $\Delta T$=about 0.25 sec. At this instant the bistable trigger 45, 46 changes over to the second stable state, so that the transistor 45 is cut off and the transistor 46 is conducting, the latter then serving as an amplifier for the local subcarrier frequency produced in the push-pull rectifier 20, the subcarrier being applied for further processing through the tuned circuit 25 and the coupling coil 26 to the electronic switches 28, 29, 30 and 31. In the manner described above a stereophonic reproduction of excellent quality is thus obtained, while the D.C. meter 53 in the collector circuit of the then conducting transistor 46 exhibits maximum deflection.

If the stereophonic signal disappears at the instant $T_2$, the bistable trigger 45, 46 will return to the first state, in the manner described above, after a given time delay, so that the pilot channel 15 is cut off by the cut-off of the transistor 46 and the D.C. meter 53 returns to the zero position.

It will now be explained more fully, the device described above provides, both with a monaural and a stereophonic input signal, a considerable improvement in the freedom of disturbances.

If, in the case of a monaural input signal, the bistable trigger 45, 46 being therefore in the first stable state, there appears an interference signal lying in the pass band of the pilot channel 15, the change-over of the bistable trigger 45, 46 to the second stable state associated with a stereophonic input signal will be produced only when the interference signal has a sufficiently high amplitude and a sufficiently great duration. If in the case of a stereophonic input signal, the trigger 45, 46 being therefore in the second stable state, an interference signal lying in the pass band of the pilot channel 15 appears, the change-over of the bistable trigger 45, 46 to the first stable state associated with the monaural input signal is performed only in the case of an adequate amplitude and an adequate duration of the interference signal. With interference signals lying within the pass band of the pilot channel 15 the device described provides not only an interference discrimination according to the amplitude but also according to the duration, so that a considerable improvement in freedom of interferences is obtained in the stereophonic receiver.

Apart from this improvement in freedom of interference the device concerned provides an improvement in stereophonic reproduction quality, since a certain hysteresis is introduced into the trigger 45, 46 in that the threshold value at which the trigger changes over from the second stable state associated with the stereophonic reproduction to the first stable state is rendered lower than that required for changing-over from the first stable state to the second stable state. With stereophonic reproduction, the trigger being in the second stable state, the pilot signal may be reduced, so that the return of the trigger to the first stable state of the monaural reproduction will be performed only at a threshold value which is lower than the threshold value at which the trigger changes over from the first stable state to the second stable state. Particularly in the case of fading it was found that a material improvement of the stereophonic reproduction quality was obtained.

In the device described above the aforesaid hysteresis effect can be adjusted in a simple manner by suitable proportioning of the common emitter impedance 51, 52 in connection with the bias voltage applied to the base electrode of the transistor 46, while the adjustment of the threshold value for the change-over of the trigger 45, 46 from the first stable state to the second stable state is obtained by applying a suitable positive bias voltage through the terminal 56 to the base electrode of the transistor 45.

Apart from the particular simplicity of construction, in which the transistor 46 of the trigger operates simultaneously as a local subcarrier amplifier, the device provides in this manner a conspicous improvement in the freedom of interference and in the reproduction quality, said stereophonic receiver switching over automatically, without mechanical agency from stereophonic reproduction to monaural reproduction according as a stereophonic or a monaural signal respectively is received. Owing to the simplicity of construction and to the simple possibilities of adjustment the stereophonic receiver is particularly interesting from the technical point of view of manufacture.

Hereinbelow some data are given for a stereophonic receiver elaborately tested in practice (see FIG. 1).

| | |
|---|---|
| Transistors 45, 46 | AF–116 |
| Resistor 23 | 39K ohms |
| Resistor 47 | 15K ohms |
| Capacitor 48 | 4700 $\mu\mu$f. |
| Resistor 49 | 3.3K ohms |
| Resistor 50 | 5.6K ohms |
| Resistor 51 | 1K ohm |
| Capacitor 52 | 0.1 $\mu$f. |
| Resistor 54 | 10K ohms |

Apart from the embodiment described above, other embodiments are possible; for example, the trigger may be constructed so that the collector circuit of each of the transistors is connected through a resistor to the base electrode of the other transistor.

As a further alternative, the trigger may be equipped with tubes. With the stereophonic receiver shown in FIG. 1 the transistors 45 and 46 may be replaced by a double tube, the cathode circuit of which includes the parallel combination of a capacitor and a resistor which corresponds with the resistor 51 and the capacitor 52, while the anode circuit of the amplifying tube corresponding to transistor 45 is connected to the control-grid circuit of the other amplifying tube in a feedback arrangement in the same manner as the transistor 45 is fed back to the base circuit of the transistor 46. In this case the direct-current meter, as an indicator, may be replaced by a tuning indicator or a neon tube; the control-voltage of which may be derived from the anode circuit of the amplifying tube corresponding to the transistor 45.

What is claimed is:

1. A frequency modulated stereo receiver for receiving two coherent stereo signals in which the carrier is frequency modulated by the sum signal of the two coherent stereo signals, the difference signal amplitude modulated on a suppressed subcarrier frequency and a pilot signal of one half the subcarrier frequency comprising, means for receiving the modulated carrier frequency and demodulating the signals therefrom, filter means for passing the demodulated pilot signal, frequency multiplying means for doubling the frequency of the pilot signal to recreate the subcarrier frequency, coupled bistable blocking means responsive to a threshold level of the recreated carrier for automatically switching from its first stable state which blocks the carrier to its second stable state which passes the carrier once the threshold is exceeded, and decoding means responsive to the sum and difference signals and the recreated carrier passed by the bistable blocking means for deriving the stereo signals.

2. A frequency modulated stereo receiver as set forth in claim 1 in which said coupled bistable blocking means comprises first and second coupled amplifying devices each having a control electrode and biased, in the absence of a pilot signal, to have the first amplifier conductive and the second cut off, resistive means connecting the control electrode of the first amplifier to the frequency doubling means whereby the direct current component of the doubled pilot signal is employed to cut off the first amplifier when the pilot signal exceeds a predetermined level, and capacitive coupling means connecting the control electrode of the second amplifier to the frequency doubling circuit whereby the recreated carrier frequency is amplified by the second amplifier while the first amplifier is cut off.

3. A frequency modulated stereo receiver for receiving two coherent stereo signals transmitted as the sum signal, the difference signal amplitude modulated on a suppressed subcarrier and a pilot signal of one half the subcarrier frequency including, an information channel for passing the demodulated sum and difference signals and a parallel connected pilot channel for passing the demodulated pilot signal comprising, a frequency doubling circuit for recreating the subcarrier frequency, a bistable blocking circuit comprising, first and second switch means, said first switch means holding said second switch means open in the absence of a pilot signal and opening on the occurrence of a pilot and closing said second switch means to pass the recreated pilot signal, and decoding means responsive to said switched pilot and said information signals for deriving the coherent stereo signals.

4. A frequency modulated stereo receiver for receiving two coherent stereo signals in which the carrier is frequency modulated by the sum signal of the two coherent stereo signals, the difference signal amplitude modulated in a suppressed subcarrier frequency and a pilot signal of one half the suppressed subcarrier frequency comprising, means for receiving the modulated carrier frequency and demodulating the signals therefrom, filter means for passing the demodulated pilot signal only, a full wave rectifier for frequency doubling the filtered pilot signal to recreate the subcarrier frequency, first and second amplifying means each having control, common and output electrodes, biasing means connected to said amplifiers for maintaining the first amplifier "on" and the second "off" in the absence of a pilot signal, resistive means connecting the control electrode of the first amplifier to the full wave rectifier output such that the first amplifier is cut off in response to a preset threshold level of the direct current component of the rectified pilot signal while the second amplifier is turned "on," capacitive means connecting the control electrode of the second amplifier to the full wave rectifier output such that the alternating component of the rectified pilot signal is amplified by the second amplifier, and decoding means responsive to the said amplified alternating component of the rectified pilot signal and the demodulated sum and difference signals for deriving the two coherent stereo signals.

5. A frequency modulated stereo receiver as set forth in claim 4 in which said second amplifier includes an indicator in the output electrode circuit for indicating the condition of the amplifier.

6. A frequency modulated stereo receiver as set forth in claim 5 in which said indicator is a direct current meter and provides a visual indication of the direct current in the output circuit of the second amplifier.

7. A frequency modulated stereo receiver for receiving two coherent stereo signals in which the carrier is frequency modulated by the sum signal of the two coherent stereo signals, the difference signal amplitude modulated on a suppressed subcarrier frequency and a pilot signal of one half the suppressed subcarrier frequency comprising, means for receiving the modulated carrier frequency and demodulating the signals therefrom, filter means for passing the demodulated pilot signal only, a full wave rectifier for frequency doubling the filtered pilot signal to recreate the subcarrier frequency, first and second transistor amplifiers each having a control, a common and an output electrode, biasing means, including a shared common electrode impedance and an impedance interconnecting the output electrode of the first transistor and the control electrode of the second, for maintaining the first transistor "on" and the second "off" in the absence of a pilot signal, resistive means connecting the first transistor control electrode to the full wave rectifier output whereby the first transistor is cut off in response to a present threshold level of the direct current component of the rectified pilot signal while the second transistor is turned "on," capacitive means connecting the second transistor control electrode to the full wave rectifier output whereby the alternating component of the rectified pilot signal is amplified by the second transistor, and decoding means responsive to the amplified alternating component of the rectified pilot signal and demodulated sum and difference signals for deriving the two coherent stereo signals.

References Cited by the Examiner

UNITED STATES PATENTS

| | | | |
|---|---|---|---|
| 3,167,615 | 1/1965 | Wilhelm et al. | 179—15 |
| 3,225,143 | 12/1965 | Parker | 179—15 |
| 3,249,697 | 5/1966 | Schroeder | 179—15 |

DAVID G. REDINBAUGH, *Primary Examiner.*

R. L. GRIFFIN, *Assistant Examiner.*